(12) United States Patent
McDermott

(10) Patent No.: US 6,302,099 B1
(45) Date of Patent: Oct. 16, 2001

(54) MODULAR SOLAR TRACKING FRAME

(76) Inventor: Patrick P. McDermott, 2411 Rocky Branch Rd., Vienna, VA (US) 22181

( * ) Notice: Subject to any disclaimer, the term of this patent is extended or adjusted under 35 U.S.C. 154(b) by 0 days.

(21) Appl. No.: 09/663,419

(22) Filed: Sep. 15, 2000

Related U.S. Application Data

(60) Provisional application No. 60/154,217, filed on Sep. 16, 1999.

(51) Int. Cl.$^7$ ........................................................ F24J 2/38
(52) U.S. Cl. ............................ 126/600; 126/605; 126/694; 126/696
(58) Field of Search ................................... 126/600–607, 126/692, 696, 697, 694

(56) References Cited

U.S. PATENT DOCUMENTS

| | | | |
|---|---|---|---|
| 4,153,039 | * 5/1979 | Carroll | ................................... 126/605 |
| 4,172,739 | 10/1979 | Tassen . | |
| 4,252,107 | 2/1981 | Horton . | |
| 4,289,118 | * 9/1981 | Stark | ................................... 126/605 |
| 4,301,321 | 11/1981 | Bartels . | |
| 4,355,630 | 10/1982 | Fattor . | |
| 4,359,041 | 11/1982 | Snodgrass . | |
| 4,365,618 | * 12/1982 | Jones | ................................... 126/605 |
| 4,457,297 | 7/1984 | Sobczak et al. . | |
| 4,463,749 | 8/1984 | Sobczak et al. . | |
| 4,476,853 | 10/1984 | Arbogast . | |
| 4,491,388 | 1/1985 | Wood . | |
| 4,535,961 | 8/1985 | Sobczak et al. . | |
| 4,566,432 | 1/1986 | Sobczak et al. . | |
| 4,628,142 | 12/1986 | Hashizume . | |
| 4,832,001 | 5/1989 | Baer . | |
| 4,870,949 | * 10/1989 | Butler | ................................... 126/605 |

* cited by examiner

*Primary Examiner*—James C. Yeung
(74) *Attorney, Agent, or Firm*—Siemens Patent Services LC

(57) ABSTRACT

The present invention offers a low cost, modular structure with a continuous, horizontal, rotatable spine supported on posts fixed to the ground, providing one axis of rotation for pointing solar collectors in the North-South direction and vertical roll axis bars mounted orthogonally to the spine providing an additional axis of rotation in the East-West direction. Push rods provide linear motion for control of any number of solar collector modules, with the linear motion being translated to rotary motion by pulleys and cables attached to wheels or arc segments mounted to the spine and roll axis bars. Thus, a whole array of solar collector modules can be driven by a single solar tracking device and two drive devices. Additionally, when arrayed in multiple rows of the number of solar collector modules controlled can be multiplied so that a "solar farm" covering a large area could be controlled by the single solar tracking device and a minimal number of drive devices.

12 Claims, 12 Drawing Sheets

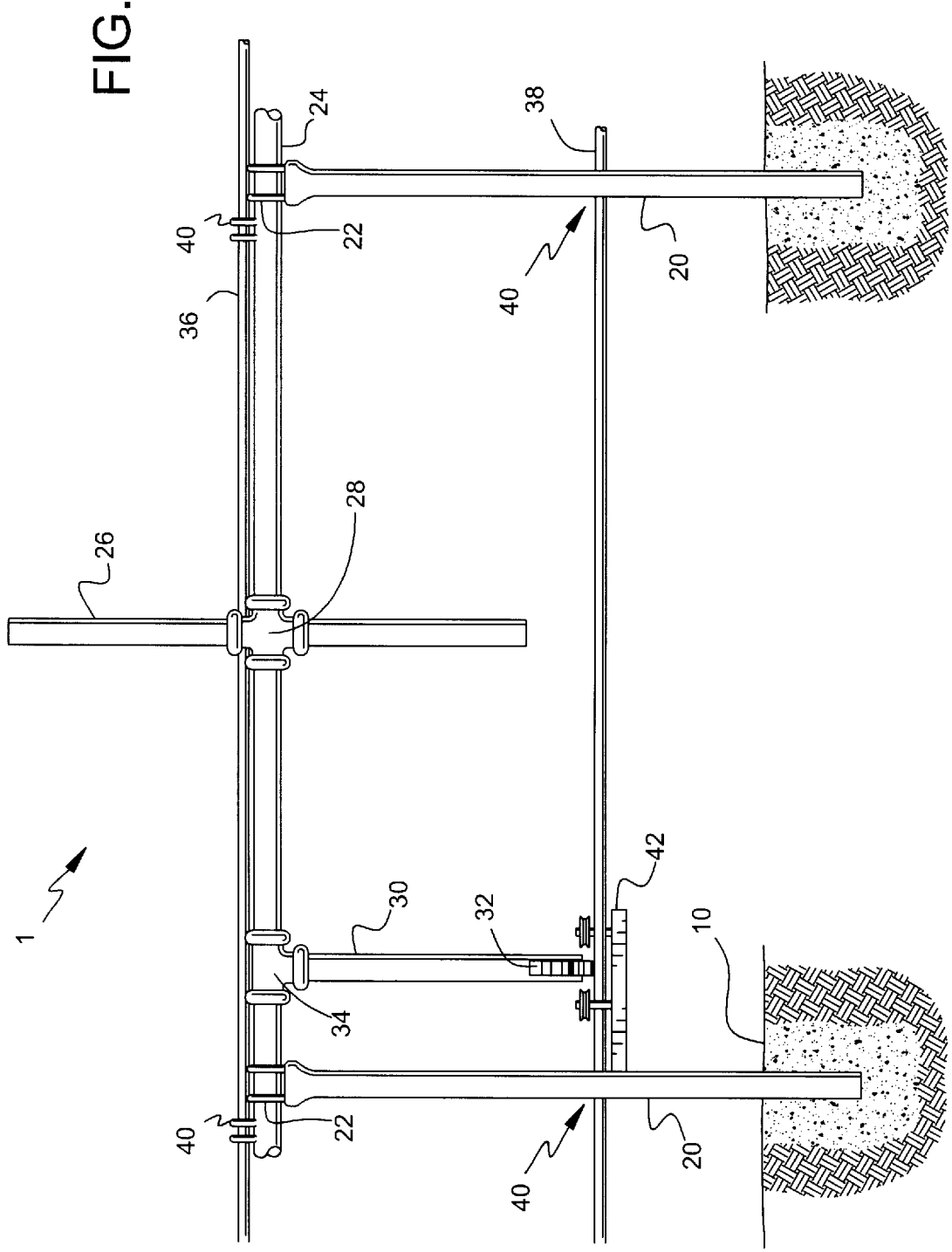

53

MODULAR SOLAR TRACKING FRAME

This application is a continuation of my Provisional Patent Application, No. 60/154,217, filed Sep 16, 1999, entitled ZENTRAK 2-D SOLAR TRACKER.

BACKGROUND OF THE INVENTION

1. Field of the Invention

The present invention relates to power generation in general, and the collection of solar energy for heat or electrical generation in specific. More particularly, the invention comprises a mounting device for solar collectors which allows tracking of the sun in two dimensions, vertically and horizontally.

2. Description of the Prior Art

The use of solar energy has progressed from early use of sun heated rocks as a passive heat source to the highly efficient, active solar collectors of today. Even in the progression from early active solar collectors there have been great strides in more recent years. Early collectors were stationary, absorbing energy as the sun passed from first a peripheral position in the east to directly overhead and then to a peripheral position in the west. More recently, solar tracking devices have allowed collectors to track the sun's path, thus presenting a more direct face to the sun as it passes overhead, allowing the normally oblique rays of morning and evening to strike the collectors directly for additional solar gain.

U.S Pat. No. 4,566,432, issued to Isidore F. Sobczak, et, al., on Jan. 28, 1986; U.S. Pat. No. 4,535,961, issued to Isidore F. Sobczak, et. al., on Aug. 20, 1985; U.S. Pat. No. 4,463,749, issued to Isidore F. Sobczak, et. al., on Aug. 7, 1984; and U.S. Pat. No. 4,457,297, issued to Isidore F. Sobczak, et. al., on Jul. 3, 1984, present MODULAR SOLAR CONCENTRATORS and a LIGHTWEIGHT AZIMUTH/ELEVATION MOUNT, wherein the mount consists of a turret which can turn 360° on its base for azimuth rotation with a lead screw providing horizontal mounted between the turret and the solar collector providing horizontal rotation. Sobczak provides a base for a single array of solar collectors while the present invention provides for mounting of multiple arrays.

U.S. Pat. No. 4,491,388, issued to Douglas E. Wood on Jan. 1, 1985, presents a SUPPORT CARRIAGE FOR A SOLAR CONCENTRATOR, similar to Sobczak in that a concentrator is mounted on a central pedestal about which it can rotate with horizontal rotation provided by a cable and track mechanism. Wood also provides a base for a single array of solar collectors while the present invention provides for mounting of multiple arrays.

U.S. Pat. No. 4,359,041, issued to Erlin E. Snodgrass on Nov. 16, 1982, presents a LIGHT ENERGY CONCENTRATING DEVICE, a collector composed of a plurality of segments, each rotatable about two axis to direct sunlight to a focal region. In Snodgrass, rotation is within the collector itself, as opposed to the present invention which is capable of rotating and tilting the entire collector to track the sun.

U.S. Pat. No. 4,301,321, issued to Frederick T. C. Bartels on Nov. 17, 1981, presents a TWO-AXIS FOCUSING ENERGY CONCENTRATOR, one of many solar concentrators which could be utilized with the present invention.

U.S. Pat. No. 4,252,107, issued to Richard H. Horton on Feb. 24, 1981, presents a SOLAR TRACKING CONCENTRATOR, a light weight, parabolic dish mounted to single pipe pedestal such that it is rotatable about a horizontal and vertical axis. Horton's pedestal will support a single concentrator, while the present invention can support any number of collectors desired.

U.S. Pat. No. 4,355,630, issued to Arthur Fattor on Oct. 26, 1982, presents a CONCENTRATING SOLAR COLLECTOR WITH TRACKING MULTIPURPOSE TARGETS, in which a focusing parabolic mirror concentrates solar on one or more positionable target(s) movable along a series of tracks. Fattor is positionable in one dimension for seasonable adjustment, while the present invention is positionable in two dimensions for continuous adjustment for tracking the sun throughout the day.

U.S. Pat. No. 4,172,739, issued to Devon Tassen on Oct. 30, 1979, presents a SUN TRACKER WITH DUAL AXIS DIURNAL MOVEMENT AND SEASONAL ADJUSTMENT. Tassen mounts a frame-work holding solar collectors on a rotatable, vertical shaft, allowing tracking of the sun about a vertical axis. Rotation of the vertical shaft is powered by a reversible, constant speed electric motor. Rotation about a horizontal axis is provided by a pair of cables and a guide means, counterbalanced by a spring mechanism, whereby rotation about the vertical axis causes one of the cables to wrap around the guide means, allowing the lower edge of the frame to be raised or lowered. Tassen supports a relatively small array of solar collectors while the present invention will support multiple arrays of collectors.

U.S. Pat. No. 4,476,853, issued to Clayton C. Arbogast on Oct. 16, 1984 presents a SOLAR ENERGY RECOVERY SYSTEM. With Arbogast, horizontal rotation is provided by a manually operated piston which elevates or lowers the upper end of a collector panel, rotating the panel around a lower pivot axis in accordance with a pivot plate indicating the proper angle for specified dates throughout the year. Vertical rotation is about pivotal connection members which connect the panel to both the manually operated piston and the lower pivot axis and is powered by a servo motor which can be controlled by a variety of different means.

U.S. Pat. No. 4,628,142, issued to Kenichi Hashizume on Dec. 9, 1986 presents SOLAR TRACKING MECHANISMS. Hashizume is designed for use in areas where conventional electrical power is not available and pivots only about the horizontal axis by means of a pair of sun sensors in the form of shape memory alloy (SMA) coils housed within compound parabolic concentrators (CMC) mounted along the opposite edges of the collector running parallel to the horizontal axis. As the SMA coil housed within the CMC aimed toward the sun heats, it expands allowing a connecting cable to relax. Simultaneously, the SMA coil shaded from the sun by its respective CMC contracts, drawing cable from a wire drum while the slack cable from the heated SMA coil winds onto a wire drum, thus turning the collector about its horizontal axis. In a second embodiment wherein the collectors are photo-voltaic cells, a DC motor powered by electric energy supplied by the cells moves the collector about its horizontal axis in a similar manner.

U.S. Pat. No. 4,832,001, issued to Stephen C. Baer on May 23, 1989, presents a LIGHTWEIGHT SOLAR PANEL SUPPORT. Baer is also designed for areas where conventional electrical power is not readily available and relies on sun sensors in the form of shaded, interconnected canisters provide the impetus for rotation. Baer's support is provided by a pair of A frame supports which are in compression supported by cable in tension. A array of collectors is supported by a pair of parallel cables separated by cross members and suspended between the A frame supports by a single cable. Rotation can be in either one or two dimensions, as the application dictates, and could again be provided by AD or DC motors should power be available.

None of the above inventions and patents, taken either singly or in combination, is seen to describe the instant invention as claimed.

SUMMARY OF THE INVENTION

The use of solar energy for heating purposes has progressed from early use of sun heated rocks as a passive heat source to the highly efficient, active solar collectors of today. Even in the progression from early active solar collectors there have been great strides in more recent years. Early collectors were stationary, absorbing energy as the sun passed from first a peripheral position in the east to directly overhead and then to a peripheral position in the west. More recently, solar tracking devices have allowed collectors to track the sun's path, thus presenting a more direct face to the sun as it passes overhead, allowing the normally oblique rays of morning and evening to strike the collectors directly for additional solar gain. The present invention offers a frame for tracking the sun which may be applied to a variety of different solar collection systems.

Accordingly, it is a principal object of the invention to provide a modular solar tracking frame which is economical to produce, install and operate.

It is another object of the invention to provide a modular solar tracking frame which is easy to install and maintain.

It is a further object of the invention to provide a modular solar tracking frame which is durable.

Still another object of the invention is to provide a modular solar tracking frame which accurately adjusts to track the sun.

An additional object of the invention is to provide a modular solar tracking frame which can support any number of solar collector arrays, either in parallel or in series.

It is again an object of the invention to provide a modular solar tracking frame which can be used with a variety of different solar tracking means.

Yet another object of the invention 15 to provide a modular solar tracking frame which can be used with a variety of different types of solar collectors.

Still another object of the invention is to provide a modular solar tracking frame in which structural members may also be used as a means of conveyance of working fluids heated by the solar collectors.

Another object of the invention is to provide a modular solar tracking frame which can be constructed with standard pips and fittings utilized in the plumbing, electrical and oil extraction industries.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a front view of the invention without any solar collectors installed.

DETAILED DESCRIPTION OF THE PREFERRED EMBODIMENTS

Figure 2A:
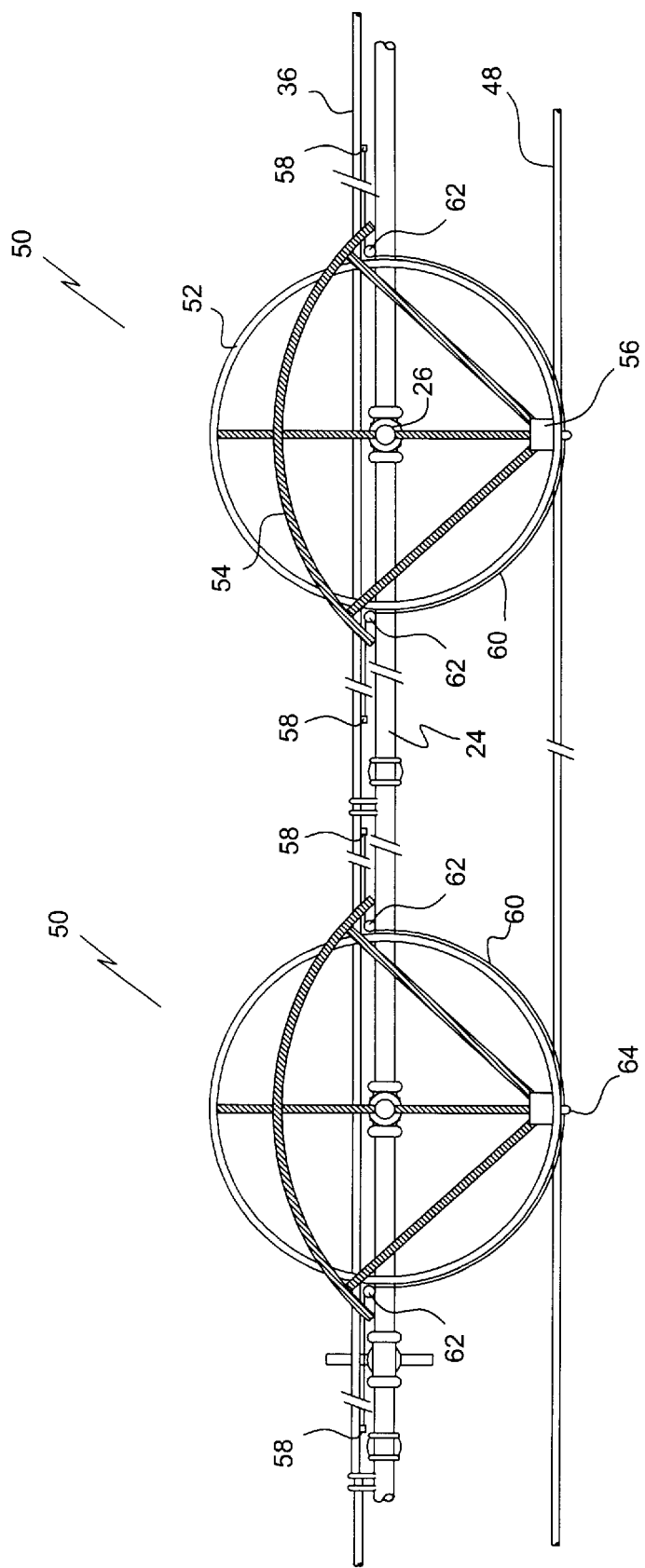
FIG. 2A is a top view of the invention, with one type of solar collector installed, detailing operation of the collector module roll mechanism.

In FIG. 1, the modular solar tracking frame 1 is composed of two vertical mounting posts 20 are fixed vertically into the ground 10 with a roller assembly or slip rings 22 at the top, sized to hold the horizontal spine 24 which is supported on the vertical mounting posts 20. Midway between each of the vertical mounting posts 20 are roll axis bars 26, orthogonal to spine 24 and joined to spine 24 by either a weld or a standard "cross" fitting 28, commonly used in the plumbing industry. Roll axis bars 26 are mounting points for solar collector modules 50, FIG. 2, which are rotatably mounted to roll axis bars 26 allowing rotation in an east-west direction. Adjacent to one vertical mounting post 20 is tilt arc segment rod 30, orthogonal to spine 24 and joined to spine 24 at one end by either a weld or a standard "T" fitting 34, also commonly used in the plumbing industry. Tilt arc segment 32 is attached to the second end of tilt arc segment rod 30, orthogonal to spine 24.

Also shown in FIG. 1 are a roll push rod 36 attached to spine 24 by slip rings 40 such as to allow for horizontal movement, and a tilt push rod 38, allowed to slide horizontally through slip rings 40 attached to vertical mounting posts 20, and tilt pulley assembly 42, mounted to one vertical mounting post 20 proximate tilt arc segment 32.

FIG. 2A shows a top view of two of the solar collector modules 50 that are linked together via a module connector rod 48. This top view also shows the roll wheel 52 in relation to the roll-axis bars 26 and parabolic mirrors 54 in the solar collector module 50. Grooved wheel track 53 (FIG. 6B) is molded into the perimeter of roll wheel 52. Roll push rod 36 imparts rotary motion through roll wheel 52 attached to the solar collector module 50, which rotate around the roll axis bar 26. On roll push rod 36 are roll cable attachment points 58 for roll cable 60, which runs through roll cable pulleys 62 attached to spine 24, grooved wheel track 53 and is attached to the roll wheel 52 at roll cable wheel attachment point 64.

It would be evident to one skilled in the art that roll cable 60 could be of a variety of composition, such as braided, single strand, or a high tensile strength flexible strap.

Figure 2B:
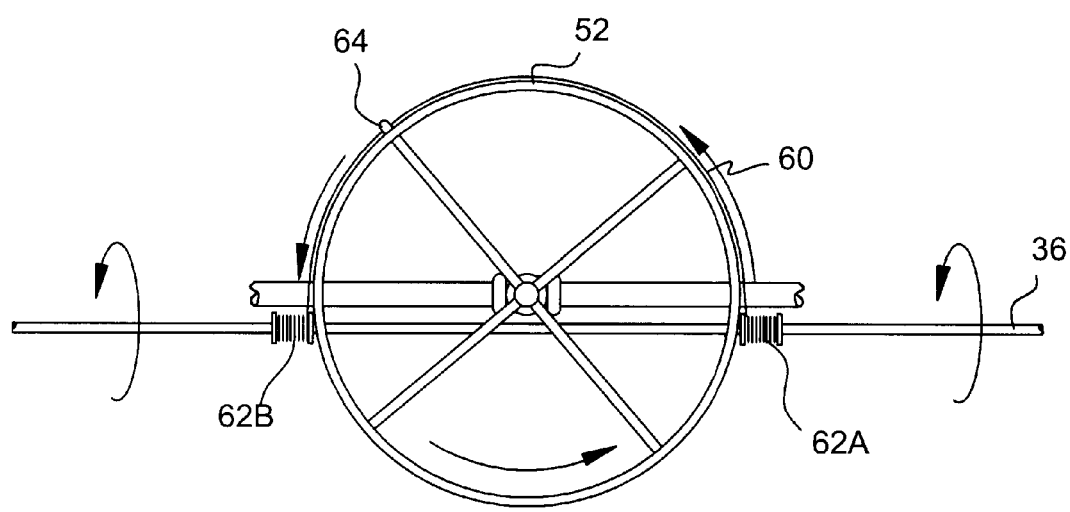
FIG. 2B is a top view of the invention, with one type of solar collector installed, detailing a second embodiment of the collector module roll mechanism.

In a second embodiment, FIG. 2B, the roll motion of solar collector modules 50 could also be induced by giving roll push rod 36 a rotary motion rather than a linear motion and replacing roll cable pulleys 62 with roll spindles 62A and 62B, with one receiving and dispensing roll cable 60 from the top and the other dispensing and receiving roll cable from below, such that as one dispenses, the other receives.

In an alternative embodiment, photo voltaic cells 56 located at the focus of the parabolic mirror 54 may be actively cooled via liquids (e.g., glycol) flowing in the module connector rod 48. It would be evident to one skilled in the art that spine 24 or module connector pipe 48, would provide a convenient conduit for a module-to-module electrical connector or flow of heat transfer fluids when used with a thermal collection system and a thermal collector 56 is used rather than photo-voltaic cells 56.

Figure 3:
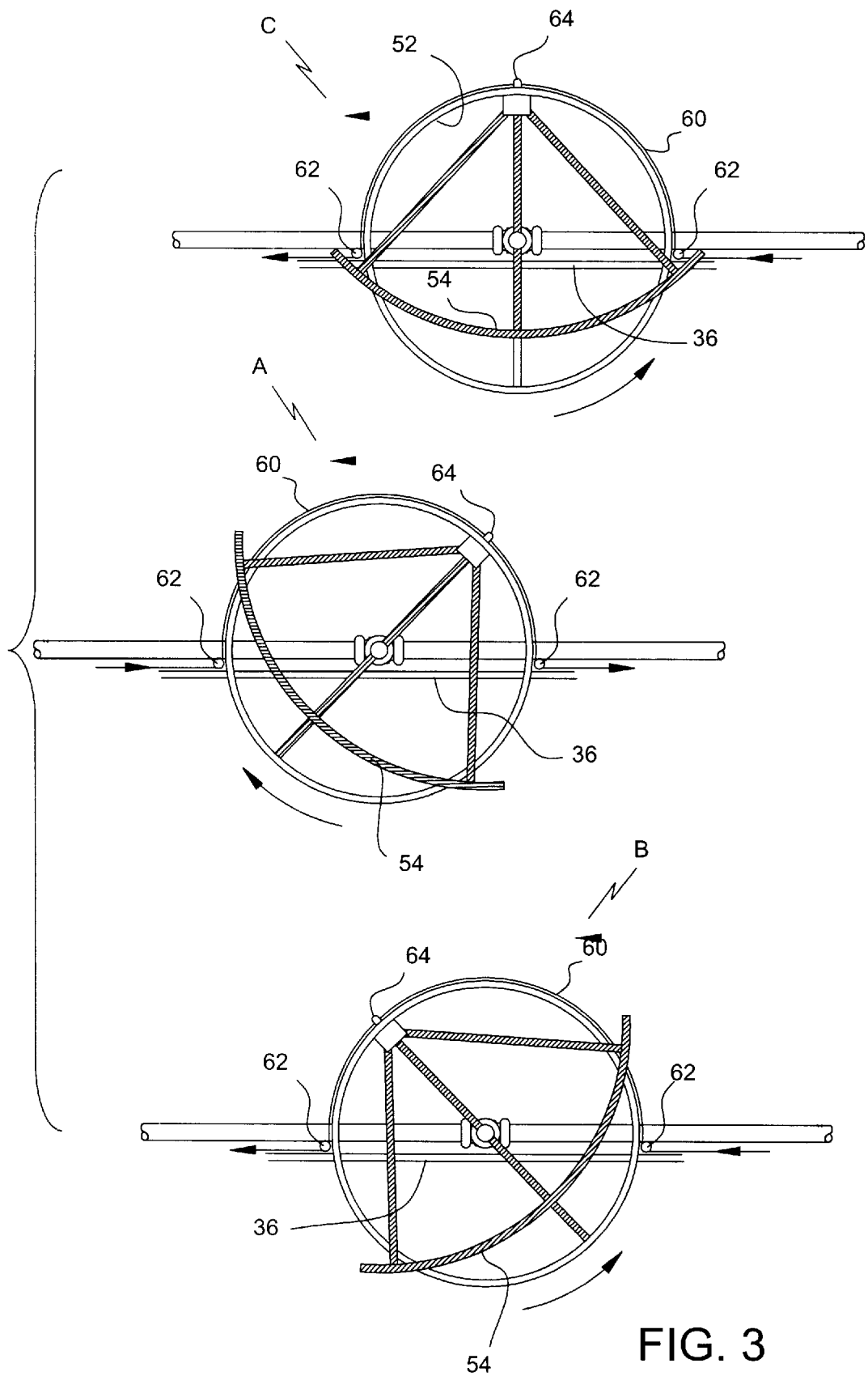
FIG. 3 is a top view of the invention, with one type of solar collector installed, further describing the operation of the collector module roll mechanism.

FIG. 3A shows the case where the roll push rod 36 is moved toward the right and rotates the solar collector module 50 in a clockwise direction. FIG. 3B shows the opposite case with roll push rod 36 motion to the left inducing a counterclockwise rotation that moves mirror focus to the right. FIG. 3C shows roll push rod 36 in a neutral position.

Figure 4A:
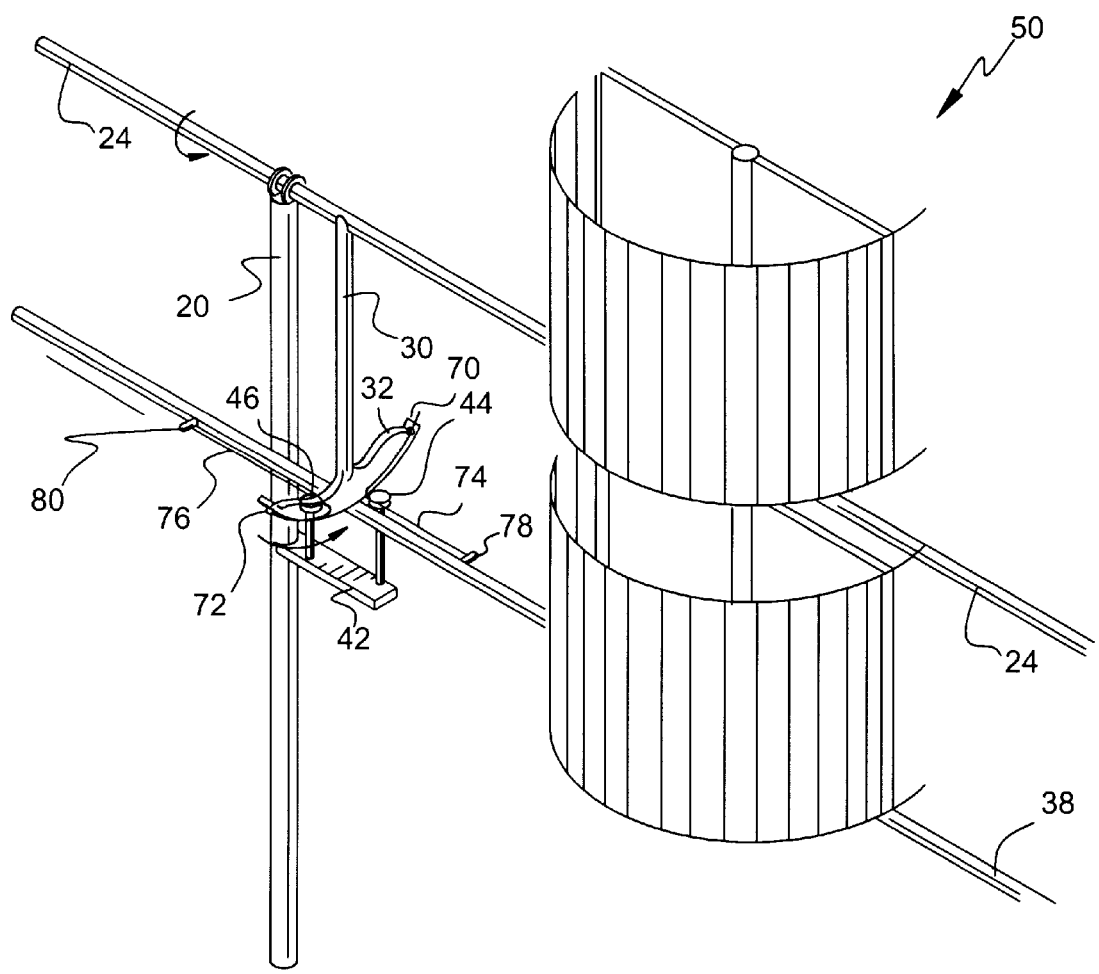
FIG. 4A and FIG. 4B are isometric views of the invention detailing operation of the collector module tilt mechanism.
Figure 4B:
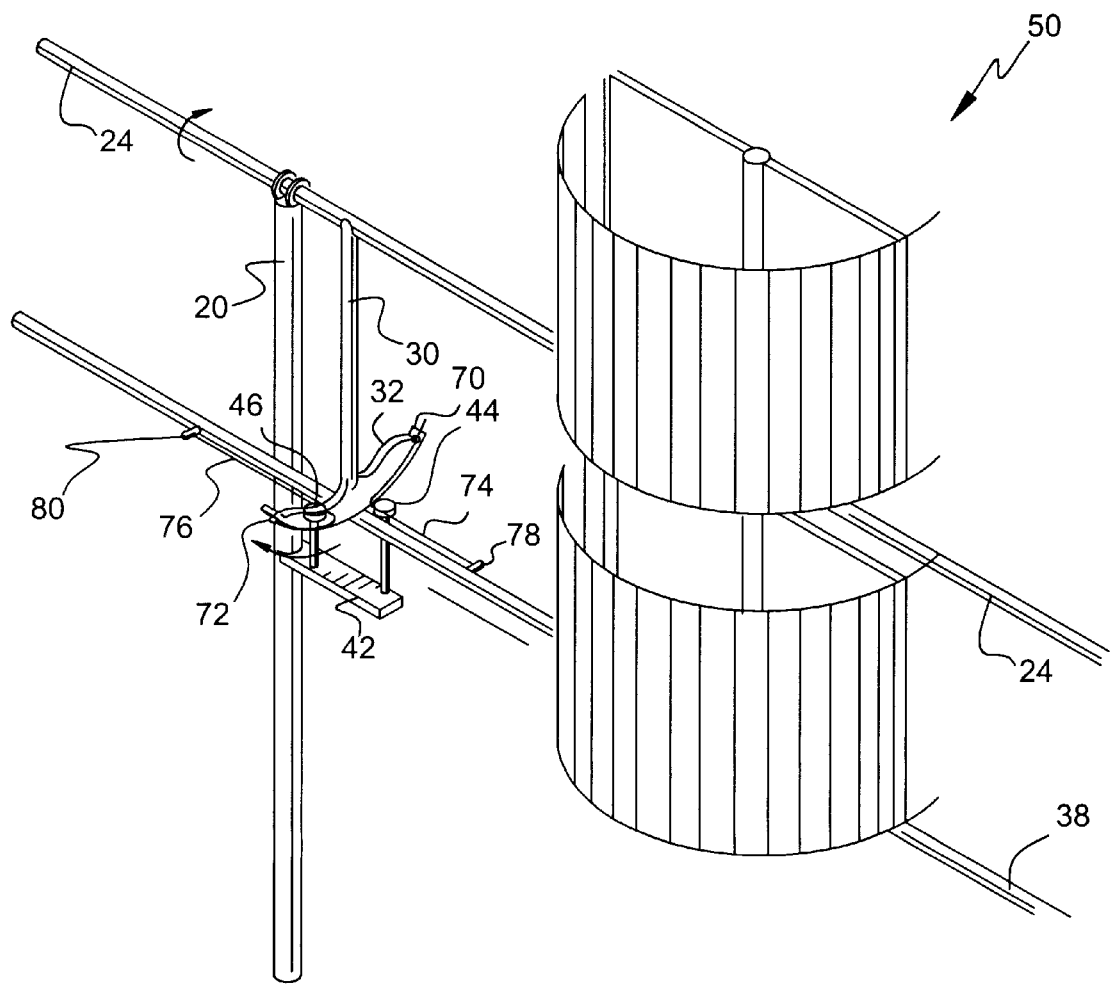

FIGS. 4A and 4B are oblique views of the tilt mechanism. Like roll wheel 52, tilt arc segment 32 has a grooved arc track 53 (FIG. 6B) formed into its perimeter. Mounted on tilt pulley assembly 42 are upper tilt pulley 44 and lower tilt pulley 46. Upper tilt cable 74 attaches to tilt arc segment 32 at upper tilt arc attachment point 70, runs through arc track 53, upper tilt pulley 44 and attaches to tilt push rod 38 at upper tilt cable attachment point 78. Lower tilt cable 76 attaches to tilt arc segment 32 at lower tilt arch attachment point 72, runs through arc track 53, lower tilt pulley 46 and attaches to tilt push rod 38 at lower tilt cable attachment point 80. FIG. 4A shows that movement of tilt push rod 38 to the left rotates spine 24 and tilts the solar collector modules 50 toward the zenith in the north-south direction. Moving tilt push rod 38 to the right, as in FIG. 4B, rotates spine 24 in the opposite direction and tilts the solar collector modules 50 towards the horizon.

Figure 4C:
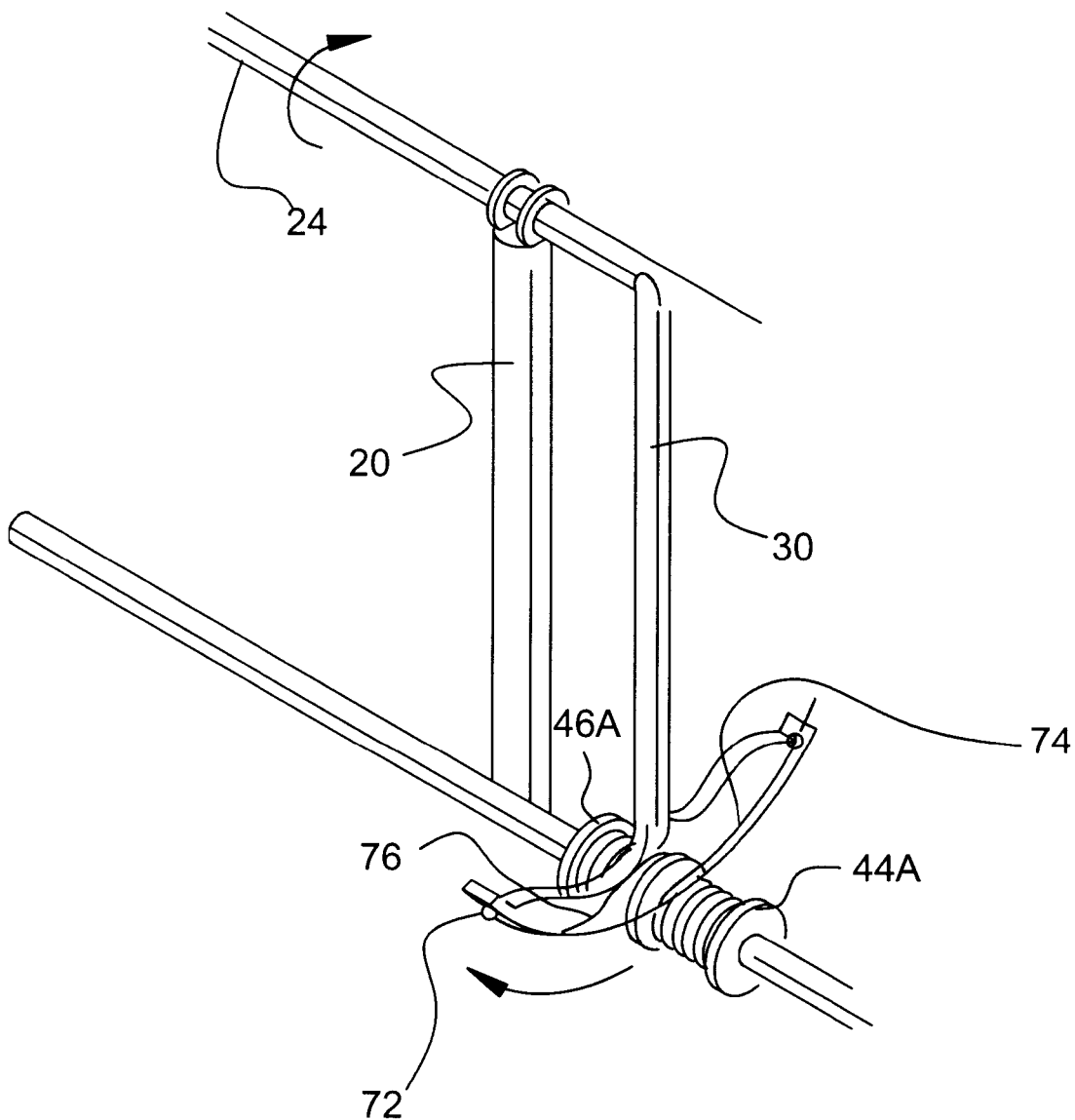
FIG. 4C is an isometric view of the invention detailing a second embodiment of the collector module tilt mechanism.

In a second embodiment, FIG. 4C, the tilt motion of solar collector modules 50 could also be induced by giving tilt push rod 38 a rotary motion rather than a linear motion and replacing tilt cable pulleys 44 and 46 with tilt spindles 44A and 46B, with one receiving and dispensing tilt cable 74 from the top and the other dispensing and receiving tilt cable 76 from below, such that as one dispenses, the other receives.

Figure 5:
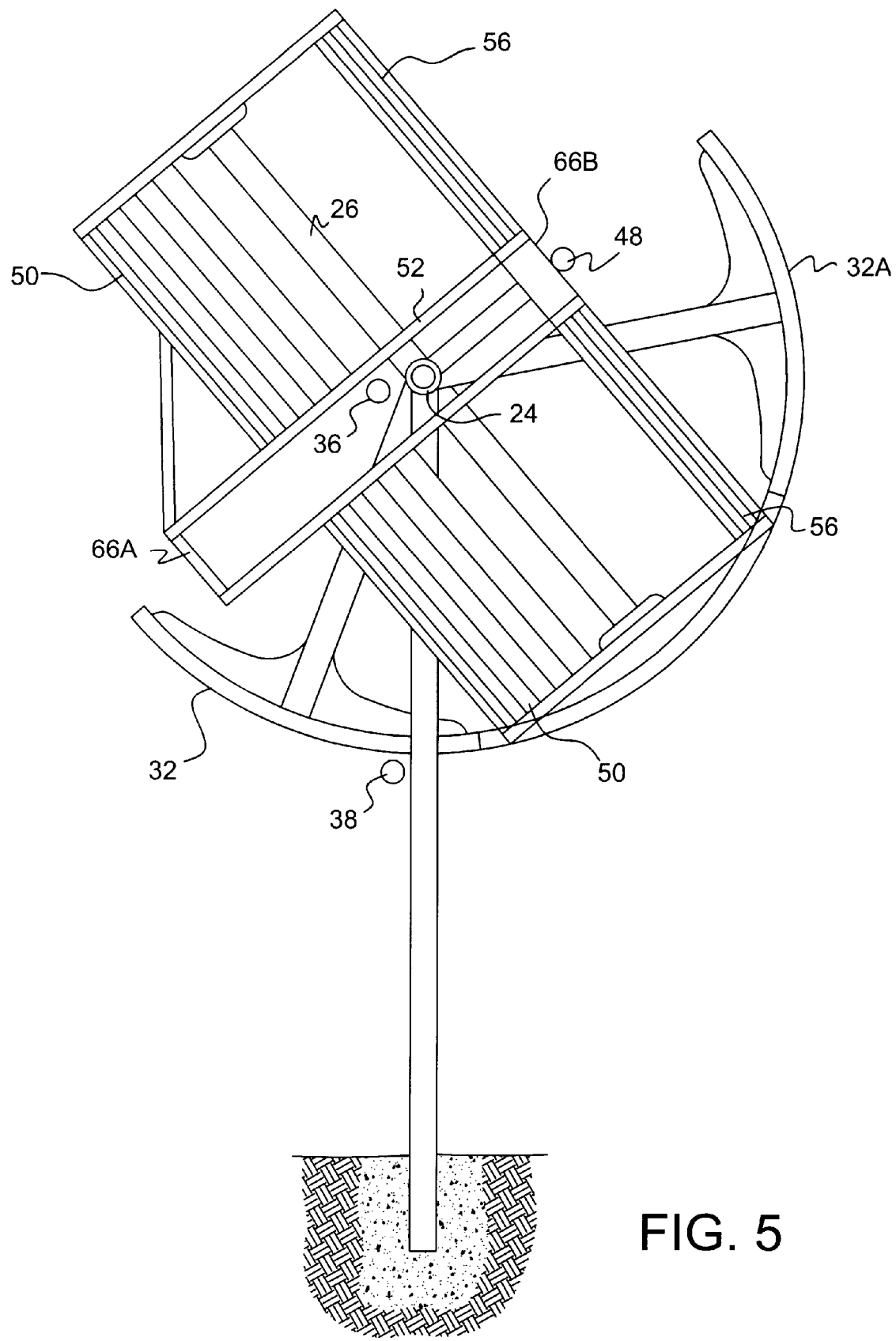
FIG. 5 is an end view of the invention with one type of solar collector installed.

Should it be desirable to tilt the solar collector modules 50 toward the ground at night or during inclement weather, tilt arc segment 32 could be extended, as illustrated by tilt arc segment 32A, shown in broken line in FIG. 5.

The side view of FIG. 5 shows an end view of the roll wheel 52 and the roll push rod 36, as well as a side-view of the tilt arc segment 32 with an end view of the tilt push rod 38. The upper and lower solar collector modules 50 are rigidly joined, front and back, at module connector points 66A and 66B so that the roll of the upper solar collector module 50, with its roll wheel 52 and roll push rod 36, also controls the roll motion of the lower solar collector module 50.

Figure 6A:
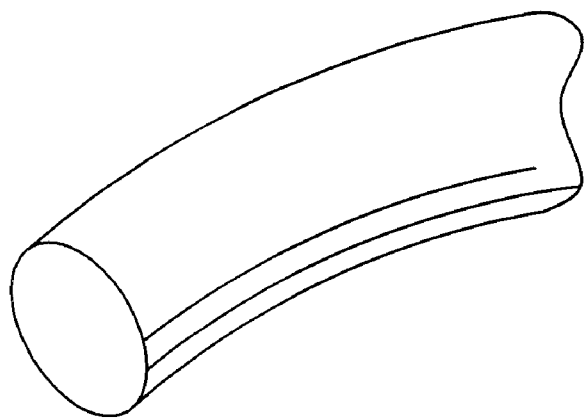
FIGS. 6A and 6B illustrate a low-cost fabrication technique for tilt arc segments and roll wheels.
Figure 6B:
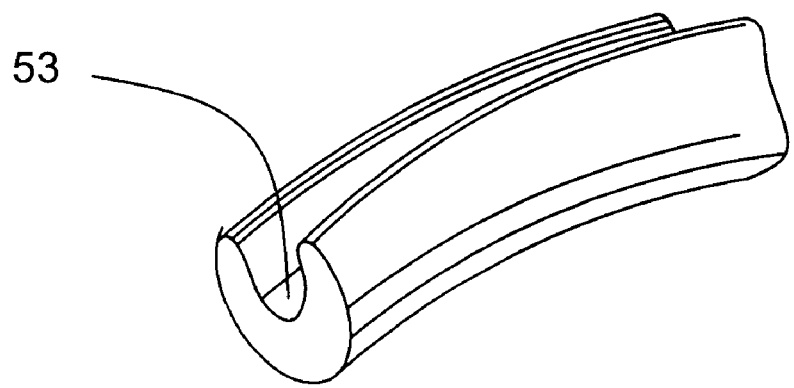

FIGS. 6A and 6B illustrate a low-cost fabrication technique for ribs, wheels and arc segments. Initially, galvanized pipe is bent around a form, which is circular in shape to form a wheel or arc segment. With the sides constrained, a tool is pushed in from the top, which crimps the pipe in the shape shown in FIG. 8B, forming an inner "U" shaped surface, which serves as the cable track 53 for the roll wheel 52 as well as the tilt arc segment 32. When the pipe is removed from the form, it rigidly retains the shape of the form.

Figure 7:
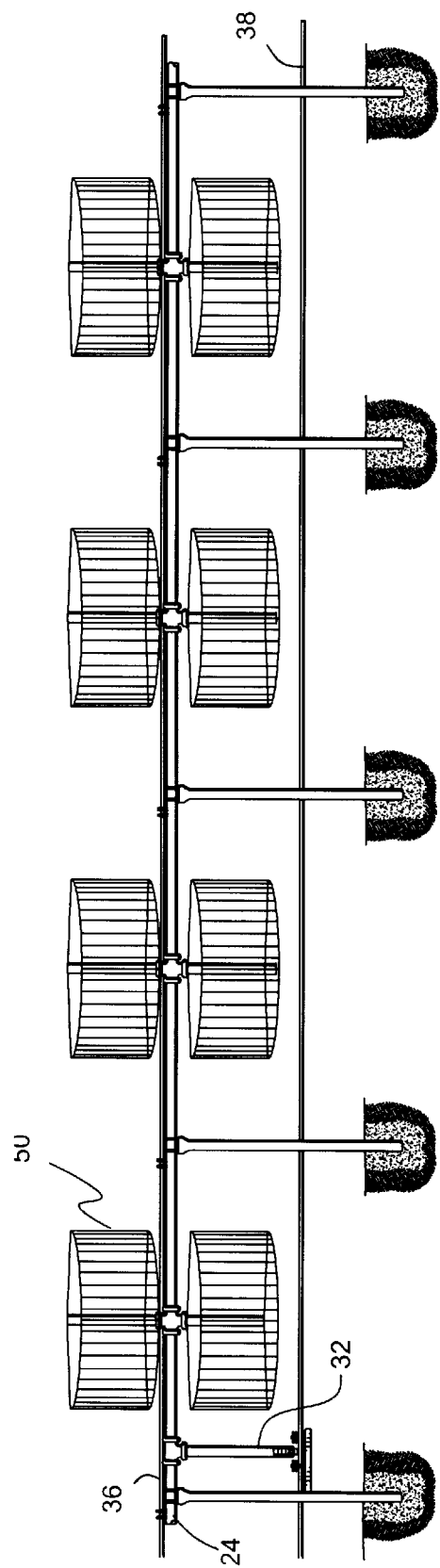
FIG. 7 is a front view of the invention with a plurality of solar collector modules installed.

FIG. 7 depicts an installation of the invention supporting multiple solar collector modules 50. It would be evident to one skilled in the art that roll wheels 52 and tilt arc segments 32 would not be required for each solar collector module 50 pair, but could be placed at approximately every fourth or fifth solar collector module 50, with roll action can being transferred to solar collector modules 50 not having a roll wheel 52 by module connector rod 48, hingedly attached to those solar collector modules 50.

Figure 8:
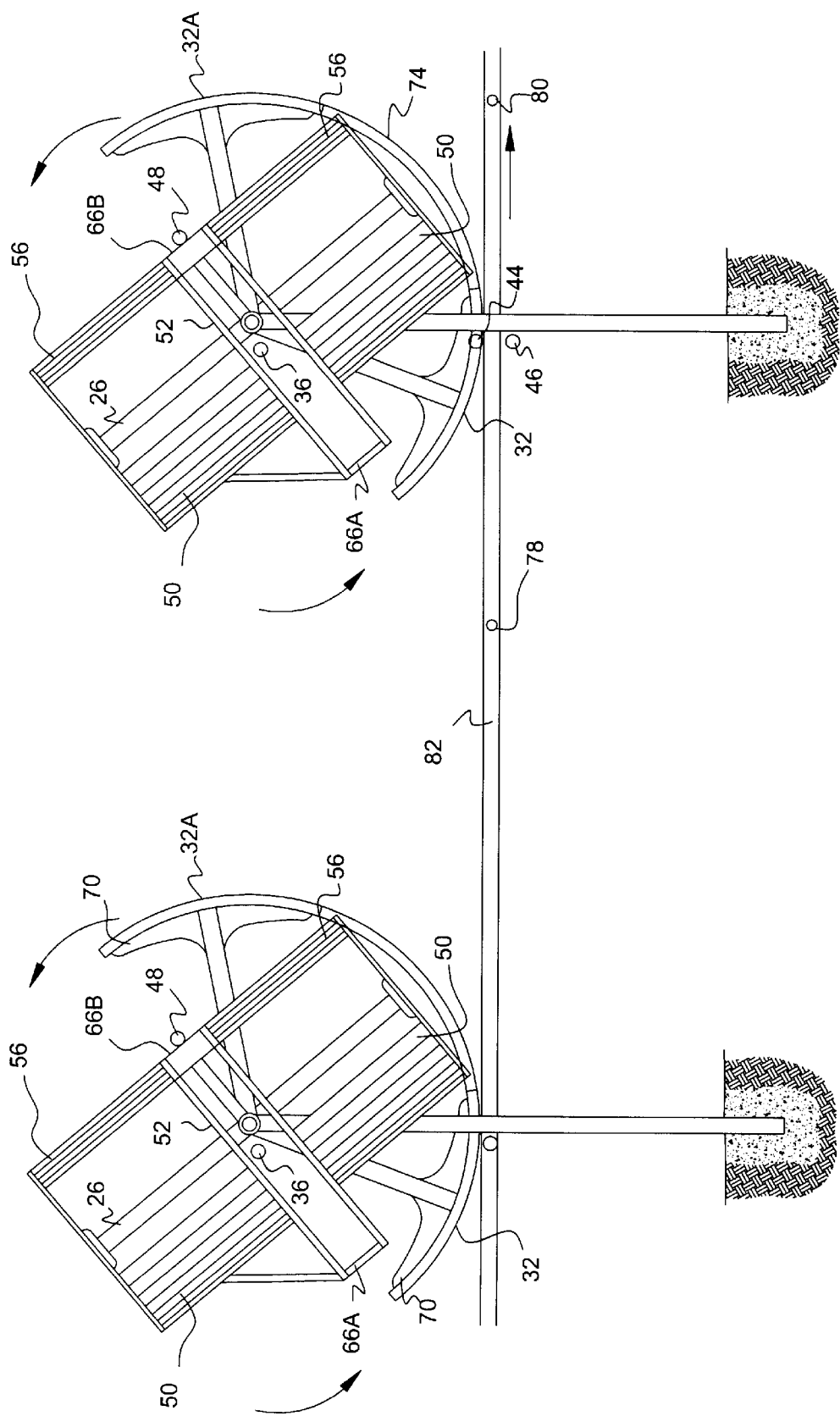
FIG. 8 is an end view of a plurality of rows of the invention connected by a single tilt mechanism drive train.

An alternate system for tilt in multi-row systems is shown in FIG. 8. Tilt push rod 38 is replaced by tilt drive train 82, which is orthogonal to the individual rows of modular solar tracking frames 1. The corresponding tilt arc segments 32 of the various rows of modular solar tracking frames 1 are connected to a tilt drive train 82 by cable and pulley, as described in FIG. 2 and FIG. 3 for roll wheel 52. It would be evident to one skilled in the art that tilt drive train 82 could also be given a rotary motion with tilt motion transferred to tilt arc segments 32 by way of spindles rather than pulleys.

Figure 9:
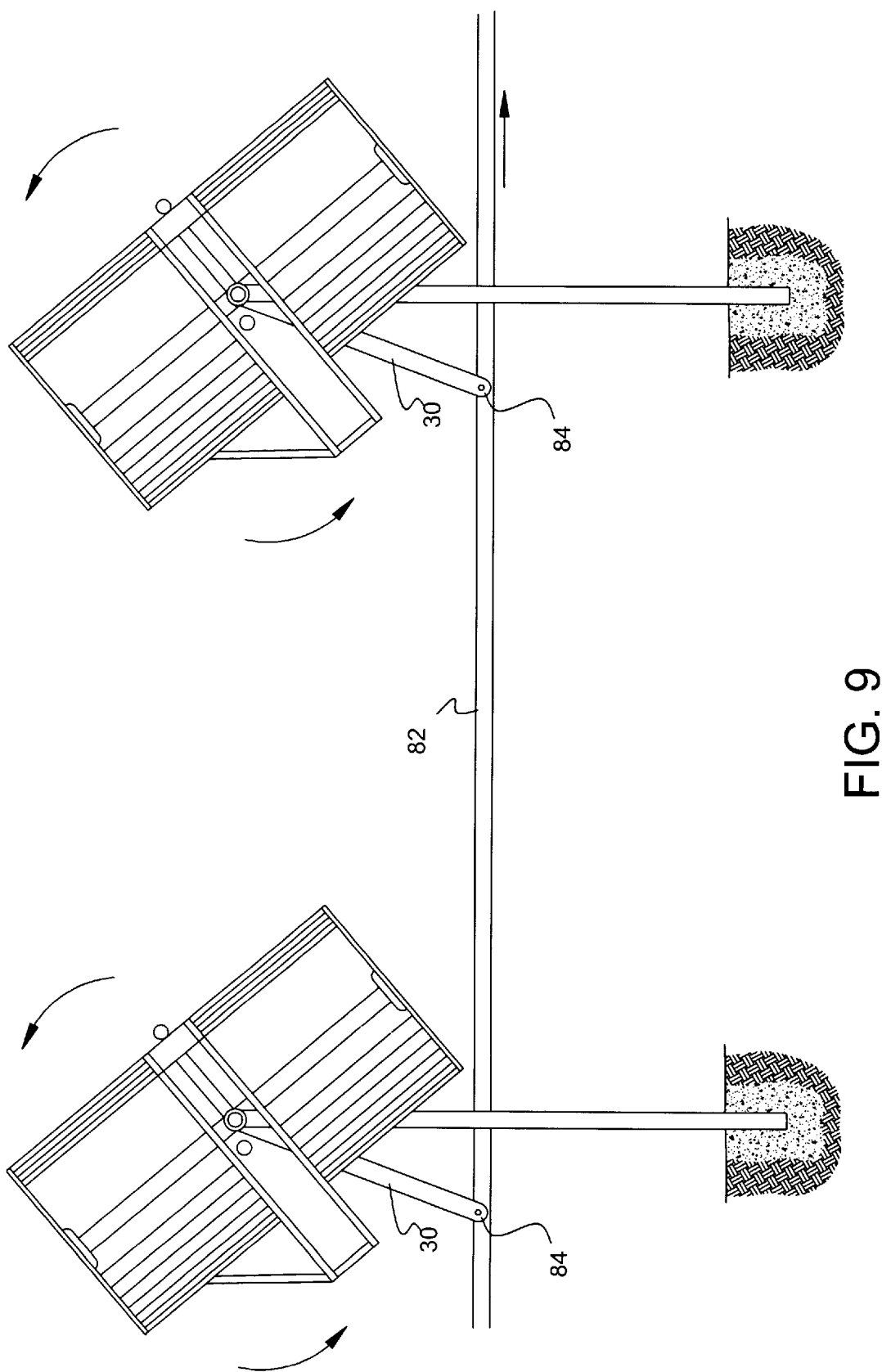
FIG. 9 is and end view of a plurality of rows of the invention connected by a second embodiment of the tilt mechanism drive train.

Alternatively, FIG. 9 illustrates a system where tilt drive train 82 is attached to tilt arc segment rod 30 by hinge 84. The arrangement in FIG. 8 allows for rotation of the solar collector modules 50 to the downward facing position, while that of FIG. 9 could be used in applications where this feature is not deemed necessary. It would be evident to one skilled in the art that with minor modifications a roll drive train could be similarly employed in a multi-row installation.

It would be further evident to one skilled in the art that a tilt push rod would not necessarily be used for each row of modular solar tracking frames when used with a tilt drive train, but rather, tilt motion could be transferred from those rows not having a tilt push rod by the tilt drive trains.

It would be evident to one skilled in the art that the present invention could support any variety of solar collector, be it flat plate, concentrator, heat transfer or photo-voltaic.

The thrust of the present invention is aimed at the modular solar tracking frame only. It would be evident to one skilled in the art that a number of different solar tracking devices could be used as well as a variety of different drive mechanisms for the roll push rod, tilt push rod and tilt drive train.

It is to be understood that the present invention is not limited to the embodiments described above, but encompasses any and all embodiments within the scope of the following claims.

What is claimed is:

1. A modular solar tracking frame, comprising:
    at least two vertical mounting posts;
    a movable spine, laterally and rotatably attached to said vertical mounting posts in a substantially horizontal plane;
    at least one roll axis bar, rigidly connected and orthogonal to said spine, each of said at least one roll axis bar having
    a solar collector module rotatably attached thereto;
    a roll push rod, moveably attached to and substantially parallel to said spine;
    a tilt push rod, moveably attached to said vertical mounting posts and substantially parallel to said roll push rod;
    means for conveying a rolling motion from said roll push rod to said solar collector module rotatably attached to each of said at least one roll axis bar for tracking the sun as it moves east-west across the sky; and means for conveying a tilting motion from said tilt push rod to said solar collector module for tracking the sun as it moves from the horizon to its zenith in a south-north direction, said means for conveying a rolling motion to said solar collector module and said means for conveying a tilting motion to said solar collector module being activated by said roll tilt rod and said tilt push rod, respectively.

2. A modular solar tracking frame, as defined in claim 1, wherein said means for conveying a rolling motion from said roll push rod to said solar collector module comprises:

a roll wheel, having a hub and being mounted to said solar collector module such that said hub of said roll wheel rotates around said roll axis bar, said roll wheel being operatively connected to said roll push rod by
a cable attached to said roll wheel proximate a midpoint on said roll wheel and to said roll push rod, on each of the two sides of said roll wheel, at a distance equal to at least one quarter the diameter of said roll wheel, and passing through
roll pulleys, mounted on said spine, one on each of the two sides of said roll wheel, at a point proximate the outer rim of said roll wheel;
said roll wheel imparting rotary motion in a east-west direction.

3. A modular solar tracking frame, as defined in claim 1, wherein said means for conveying a tilting motion from said tilt push rod to said solar collector module comprises:

at least one tilt arc rod, rigidly connected to and orthogonal to said spine, having
a tilt arc segment, rigidly attached thereto, orthogonal to said spine;
a tilt pulley mount, having tilt pulleys, rigidly connected to said vertical mounting post and aligned at a point proximate the intersection of said tilt arc segment and said tilt push rod, said tilt arc segment being
moveably attached to said tilt arc rod by cables attached, one at each of the two extreme ends of said tilt arc segment and to said tilt push rod on each of the two sides of said tilt arc segment, at a distance equal to at least one half the length of said tilt arc segment and passing through said tilt pulleys;
said tilt arc segment imparting rotary motion in a north-south direction.

4. A modular solar tracking frame, as defined in claim 1, wherein said means for conveying a rolling motion from said roll push rod to said solar collector module further comprises:

a roll wheel, having a hub and being mounted to said solar collector module such that said hub of said roll wheel rotates around said roll axis bar, said roll wheel being operatively connected to said roll push rod by
a cable attached to said roll wheel proximate a midpoint on said roll wheel and to said roll push rod, on each of the two sides of said roll wheel, at a distance equal to at least one quarter the diameter of said roll wheel, and passing through
roll pulleys, mounted on said spine, one on each of the two sides of said roll wheel, at a point proximate the outer rim of said roll wheel;
said roll wheel imparting rotary motion in a east-west direction; and said means for conveying a tilting motion from said tilt push rod to said solar collector module further comprises:

at least one tilt arc rod, rigidly connected to and orthogonal to said spine, having
a tilt arc segment, rigidly attached thereto, orthogonal to said spine;
a tilt pulley mount, having tilt pulleys, connected to said vertical mounting post and aligned at a point proximate the intersection of said tilt arc segment; and
said tilt push rod, said tilt arc segment being
moveably attached to said tilt arc rod by cables attached, one at each of the two extreme ends of said tilt arc segment and to said tilt push rod on each of the two sides of said tilt arc segment, at a distance equal to at least one half the length of said tilt arc segment and passing through said tilt pulleys;
said tilt arc segment imparting rotary motion in a north-south direction.

5. A plurality modular solar tracking frames, as defined in claim 4, disposed end to end, any two adjacent of said modular solar tracking frames share a common vertical mounting post.

6. A modular solar tracking frame, as defined in claim 5, wherein said roll wheel is mounted only to predetermined, selected ones of said solar collector modules, and
said solar collector modules intermediate to said predetermined selected solar collector modules being connected to said roll wheels by a module connector rod hingedly attached to said intermediate solar collector modules.

7. A modular solar tracking frame, as defined in claim 5, wherein said tilt arc segment is connected only at predetermined selected ones of said solar collector modules.

8. A modular solar tracking frame, comprising:

at least two vertical mounting posts;

a movable spine, laterally and rotatably attached to said vertical mounting posts and being disposed in a substantially horizontal plane;

at least one roll axis bar, rigidly connected to and orthogonal to said spine, each of said at least one roll axis bar having
at least one solar collector module rotatably attached thereto, and,
a roll wheel, having a hub and being mounted to said solar collector module such that said hub of said roll wheel rotates around said roll axis bar;

a roll push rod,
rotatably attached to and parallel to said spine and
moveably attached to said roll wheel by means of
a cable attached to said roll wheel proximate a midpoint on said roll wheel and to
roll spindles, mounted on said roll push rod, on each of the two sides of said roll wheel, at a point proximate the outer rim of said roll wheel such that one of said cables is rolled on to one of said roll spindles while the other of said cable is played out from the other of said roll spindles;

said roll wheel imparting rotary motion in an east-west direction;

at least one tilt arc rod, rigidly connected to and orthogonal to said spine, having
a tilt arc segment, rigidly attached thereto, orthogonal to said spine;

a tilt push rod,
rotatably attached to said vertical mounting posts and moveably attached to said tilt arc segment by
 cables attached to said tilt arc segment, one at each of the two extreme ends of said tilt arc segment, and to
 tilt spindles, mounted on said tilt push rod, on each of the two sides of said tilt arc segment, at a point proximate the intersection of said tilt arc segment and said tilt push rod such that one of said cables is rolled on to one of said tilt spindles while the other of said cables is played out from the other of said tilt spindles,
said tilt arc segment imparting rotary motion in a north-south direction.

9. A plurality of modular solar tracking frame, as defined in claim 8, wherein any two adjacent of said modular tracking frames share a common vertical mounting post.

10. A modular solar tracking frame, as defined in claim 8, wherein
said roll wheel is mounted only to predetermined selected ones of said solar collector modules, and
said solar collector modules intermediate said predetermined selected solar collector modules being connected to said roll wheels by a module connector rod hingedly attached to said intermediate solar collector modules.

11. A modular solar tracking frame, as defined in claim 8, wherein
said tilt arc segment is connected only at predetermined selected ones of said solar collector modules.

12. A plurality of rows of modular solar tracking frames, each of said rows being parallel to one another and comprising:
a plurality of vertical mounting posts;
a movable spine, laterally and rotatably attached to said vertical mounting posts in a substantially horizontal plane;
a plurality of roll axis bars, rigidly connected to and orthogonal to said spine, each of said roll axis bars having
 a solar collector module rotatably attached thereto, predetermined selected ones of said solar collector modules having
  a roll wheel, having a hub and being mounted such that said hub of said roll wheel rotates around said roll axis bar;
a roll push rod,
 moveably attached to and parallel to said spine and moveably attached to said roll wheels by means of
  a cable attached to each of said roll wheels proximate a midpoint on said roll wheel and to said roll push rod, on each of the two sides of said roll wheel, at a distance equal to at least one quarter the diameter of said roll wheel, and passing through
  roll pulleys, mounted on said spine, on each of the two sides of said roll wheel, at a point proximate the outer rim of said roll wheel,
said roll wheels imparting rotary motion in a east-west direction;
a plurality of tilt arc rods, rigidly connected to and orthogonal to said spine, having
 a tilt arc segment, rigidly attached to each thereof, orthogonal to said spine;
a tilt pulley mount, having tilt pulleys, connected rigidly to said vertical mounting post and aligned at a point proximate the intersection of each of said tilt arc segments and
a tilt drive train relating to the corresponding of said tilt arc segments of each of said rows of modular solar tracking frames, said tilt drive train being
 orthogonal to said plurality of rows of modular solar tracking frames,
 moveably mounted to said vertical mounting posts,
 moveably attached to each of said corresponding tilt arc segment by cables attached, one at each of the extreme ends of said tilt arc segment and to said tilt drive train, on each of the two sides of said tilt arc segment, at a distance equal to at least one half the length of said tilt arc segment and passing through said tilt pulleys,
said tilt arc segment imparting rotary motion in a north-south direction.

* * * * *